United States Patent [19]

Uehara

[11] Patent Number: 5,769,722
[45] Date of Patent: Jun. 23, 1998

[54] TRAPEZOIDAL SHAPED COIL SPRING FOR A DAMPER DISC APPARATUS

[75] Inventor: Hiroshi Uehara, Hirakata, Japan

[73] Assignee: Exedy Corporation, Osaka, Japan

[21] Appl. No.: 612,996

[22] Filed: Mar. 8, 1996

[30] Foreign Application Priority Data

Mar. 17, 1995 [JP] Japan .................................. 7-058864

[51] Int. Cl.⁶ .................................................. F16D 3/12
[52] U.S. Cl. .............................. 464/68; 464/66; 267/180; 192/203
[58] Field of Search ................................ 464/63, 64, 66, 464/68; 267/367, 166, 170; 192/203

[56] References Cited

U.S. PATENT DOCUMENTS

| | | | |
|---|---|---|---|
| 4,148,200 | 4/1979 | Schallhorn et al. | 464/66 X |
| 4,548,311 | 10/1985 | Lech, Jr. | 464/68 X |
| 4,573,945 | 3/1986 | Kajitani et al. | 464/68 |
| 5,004,088 | 4/1991 | Bolton | 464/68 X |
| 5,052,664 | 10/1991 | Lesher et al. | 464/67 X |
| 5,059,155 | 10/1991 | Tojima | 464/68 |
| 5,090,945 | 2/1992 | Graton et al. | 464/64 |
| 5,205,389 | 4/1993 | Raab et al. | 464/68 X |
| 5,580,312 | 12/1996 | Takeuchi et al. | 464/68 |

FOREIGN PATENT DOCUMENTS 2105002   3/1983   United Kingdom ................... 464/68

*Primary Examiner*—Katherine Matecki
*Assistant Examiner*—William A. Rivera
*Attorney, Agent, or Firm*—Shinjyu An Intellectual Property Firm Osaka, Japan

[57] ABSTRACT

A damper apparatus which includes a first disc member, at least one coil spring, and a second disc member. The first disc member includes at least one window generally trapezoidal in shape, with at least one coil spring disposed within each window. The coil spring comprises a plurality of wire coils that spirally extend at a generally constant pitch and include first and second end portions, with the end portions being tapered and disposed in the same plane as the last coil on each end of the coil spring. The overall shape of the coil spring when in a torsion and stress free state is generally trapezoidal. The second disc member is disposed on one or both sides of the first disc member and includes a portion which engages with the first and second end portions of the coil spring.

6 Claims, 4 Drawing Sheets

TRAPEZOIDAL SHAPED COIL SPRING FOR A DAMPER DISC APPARATUS

BACKGROUND OF THE INVENTION

1. Field of the Invention

The present invention relates to a coil spring for a damper disc assembly, and more particularly to a coil spring shaped to accommodate arcuate deformation.

2. Description of the Related Art

In a conventional clutch disc assembly, torque is transmitted via coil springs disposed in a damper apparatus. This type of clutch disc assembly includes a hub flange, and plate members disposed on opposing sides of the hub flange. Each of the plate members include at least one generally rectangular window in which a coil spring is disposed, and raised portions formed in the plate members which keep the coil spring firmly disposed in the windows. Each coil spring is composed of a metal wire which has been coiled at a constant pitch. Both ends of the coil spring are often cut so as to allow the ends to lie generally flat against the end portions of the windows.

In this type of clutch disc assembly, when the plate members and the hub flange are rotated relative to each other, the coil springs are compressed within the window. When this occurs, the outer circumferential portion of each coil spring is elastically deformed more than the inner circumferential portion. In other words, the elastic deformation and stress applied to the coil spring on its inner circumferential portion is larger than that applied to its outer circumferential portion. As a result, the coil spring will not only undergo a shearing stress (which will normally occur upon expansion or compression), but it will also undergo a bending stress. In addition, the outer circumferential portion of the coil spring will likely be brought into contact with other portions of the window and therefore be prematurely worn. The service life of the coil spring and the damper apparatus may therefore be shortened.

In order to address this problem, a damper apparatus has been proposed in which the upper circumferential portion of the window and the coil spring disposed therein are both arcuate. In this type of damper apparatus, when the hub flange and the plate members are rotated relative to each other, there is little or no difference in the amount of elastic deformation or stress applied to the outer and inner circumferential sides of the coil spring. This allows the service life of the coil spring and damper apparatus to be extended.

However with this type of damper apparatus, a small gap is created between the end portions of the coil spring and the radially extending end portions of the window. This is due to the fact that the end portions of the coil spring do not lie flat against the radially extending end portions of the window. Due to the existence of this gap, both the coil spring and the window are likely to be subjected to excessive wear when the clutch disc is rotated and coil springs are elastically deformed.

SUMMARY OF THE INVENTION

It is therefore an object of the present invention to prevent the excessive wear of the coil springs and windows in the damper apparatus of a clutch disc assembly.

According to one aspect of the present invention, a coil spring includes a plurality of wire coils which spirally extend at a generally constant pitch. The coil spring further includes a first coil and a last coil, with the first coil having a first end portion and the last coil having a second end portion. The first and second end portions include a tapered surface disposed in a plane defined by the first and the last coils of the coil spring. The coil spring has a generally trapezoidal shape in a torsion and stress free state.

According to another aspect of the present invention, a damper apparatus in a clutch disc assembly includes a first disc member, a second disc member, and a coil spring. The first disc member includes at least one first window formed therein that is generally trapezoidal in shape. The second disc member includes at least one second window formed therein that is generally trapezoidal in shape. The first and second disc members are disposed adjacent to one another such that the first and second windows coincide. The coil spring is disposed within the first and second windows, and elastically couple the first and second disc members. The coil springs include a plurality of wire coils which spirally extend at a generally constant pitch and include a first coil and a last coil. The first coil includes a first end portion and the last coil includes a second end portion. Each of the first and second end portions include a tapered surface that is disposed in a plane defined by the first and last coils respectively. The coil spring has a generally trapezoidal shape in a torsion and stress free state.

According to yet another aspect of the present invention, each of the first and second windows are formed with end faces which generally coincide with a line which extends radially outward from an axial center of the first and second disc members.

According to yet another aspect of the present invention, a hub is disposed within a central portion of the first disc member, the hub being configured for limited angular displacement with respect to the first disc member.

According to yet another aspect of the present invention, a second coil spring is disposed between the first disc member and the hub, with the second coil spring elastically connecting the hub and the first disc member.

According to yet another aspect of the present invention, a friction member is disposed between the first and second disc members for creating friction in response to relative angular displacement between the first disc member and the hub.

According to the present invention, when the first disc member and the second disc member are rotated relative to each other, the coil spring is elastically deformed between these two components. Because there are no gaps between the end portions of the coil spring and the radially extending ends of the windows, and because the coil spring is elastically deformed evenly and smoothly, there is little or no friction between the coil spring and the disc members, thus allowing the service life of the coil spring and the damper apparatus to be extended.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

Figure 1:
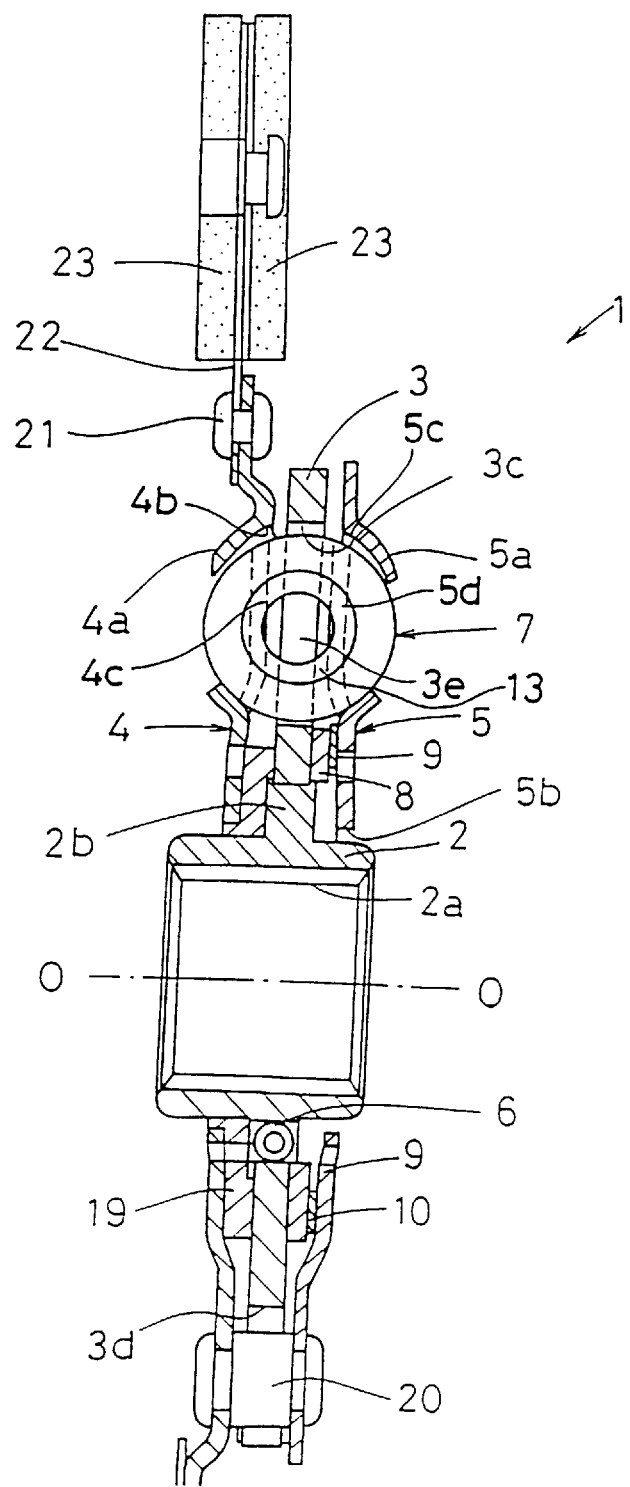
FIG. 1 is a fragmentary, part section, part elevation of a clutch disc assembly according to one embodiment of the present invention.

A clutch disc assembly 1 in accordance with one embodiment of the present invention is shown in FIG. 1. The line 0—0 represents the axis of rotation of the clutch disc assembly 1.

Figure 2:
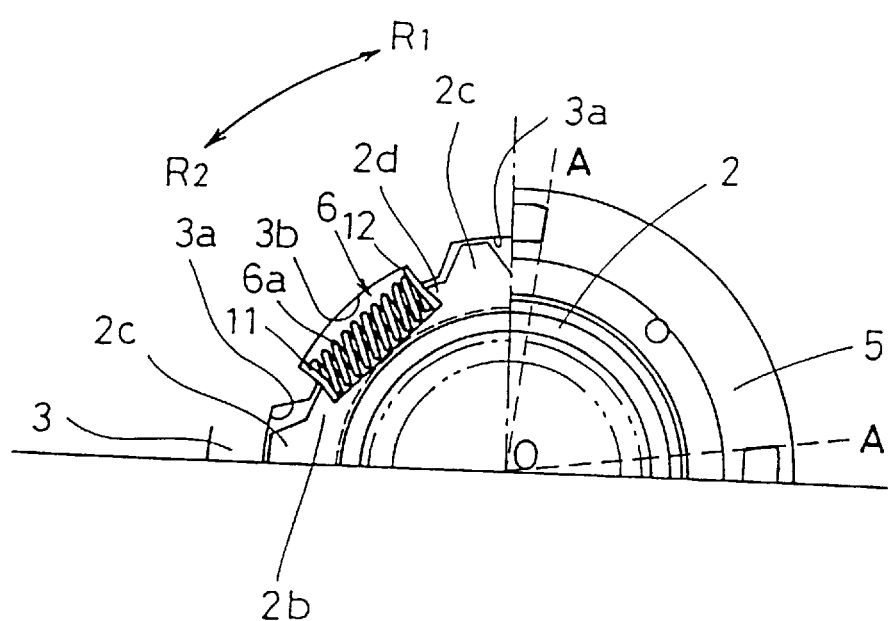
FIG. 2 is a fragmentary, part cutaway, part elevation of a portion of the clutch disc assembly shown in FIG. 1.

A hub 2, configured to be connected to a input shaft (not shown) of a transmission (not shown), is disposed at the center of the clutch disc assembly 1. The hub 2 includes a spline hole 2a disposed in its central portion, and a first flange 2b disposed around its radial outer portion. FIG. 2 shows a plurality of projections 2c formed at equal intervals along the outer circumferential portion of the first flange 2b. FIG. 2 also shows two first receiving portions 2d, which are formed at least two opposing positions along the outer circumferential portion of the hub 2 between two projections 2c.

As can be seen in FIG. 1, a second flange 3 is generally disc-shaped and is disposed around the outer circumferential portion of the hub 2. FIG. 2 shows recesses 3a formed on the inner circumferential portion of the second flange 3. These recesses 3a are sized to allow the projections 2c of the hub 2 to fit within the recesses 3a when the hub 2 and the second flange 3 are assembled together. A predetermined distance is defined between the recesses 3a and the projections 2c in the circumferential direction, and allows the hub 2 and the second flange 3 to be rotatable within a predetermined angular range. In FIG. 2, the projections 2c are shown in a neutral position, disposed slightly off center within the recesses 3a, where there is no torsional stress or torque applied to the clutch disc assembly 1.

Second receiving portions 3b are formed at two opposite positions on the inner circumferential side of the second flange 3 (only one second receiving portion 3b is shown in FIG. 2). When the hub 2 and the second flange 3 are assembled together, each second receiving portions 3b is aligned with the two corresponding first receiving portions 2d and define a first cutaway 6.

A first coil spring 6a is disposed within the first cutaway 6. A first seat member 11 and a second seat member 12 are disposed at opposite ends of the first coil spring 6a within the first cutaway 6. First coil spring 6a is deformable in response to relative angular displacement between the hub 2 and the second flange 3.

Figure 3:
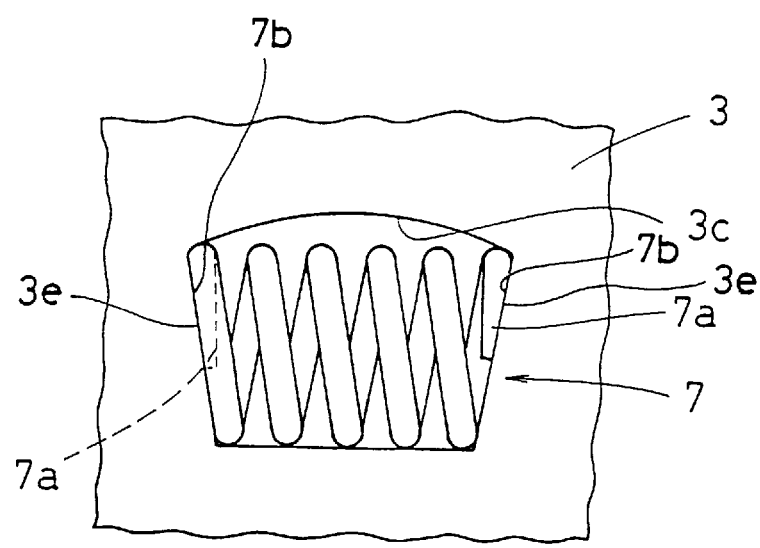
FIG. 3 is a fragmentary elevation of a portion of the clutch disc assembly depicted in FIG. 1, showing a flange window and a coil spring.

FIGS. 1 and 3 show a second window 3c. At least one second window 3c is disposed on a radial intermediate portion of the second flange 3, although for balance, three second windows 3c are desirable. As can be seen in FIG. 3, second window 3c is generally trapezoidal in shape and has a generally arcuate outer circumferential portion and two radially extending side portions 3e. FIG. 1 also shows a third window 3d, at least one of which is disposed on an outer circumferential portion of the second flange 3.

FIG. 1 also shows a clutch plate 4 and a retaining plate 5, which function as input members and are rotatably engaged with the outer circumferential side of the hub 2. The clutch plate 4 and the retaining plate 5 are a pair of generally disc-shaped members and are disposed on either side of the second flange 3. The clutch plate 4 and the retaining plate 5 are fixed to each other at their outer circumferential portions by a plurality of pins 20. These pins 20 are arranged so as to pass through the third windows 3d formed at the outer circumferential portion of the separate flange 3. Since a predetermined interval is kept in the circumferential direction between the pins 20 and the third windows 3d, the clutch plate 4, the retaining plate 5 are relatively rotatable with respect to the separate flange 3. The pins 20 limit the relative rotation between the clutch plate 4 and the retaining plate 5. When these plates are brought into contact the edges of the third windows 3d, no further relative rotation is possible.

Clutch plate 4 further includes at least one fourth window 4b, and retaining plate 5 further includes at least one fifth window 5c. Both fourth windows 4b and fifth windows 5c are, like second window 3c, generally trapezoidal in shape and have a generally arcuate outer circumferential portion and two radially extending side portions 4c and 5d respectively. The radially extending side portions of second window 3c, fourth window 4b and fifth window 5c generally coincide with a line A (shown in FIG. 2) which extends radially outwardly from the axis of rotation of the damper disc assembly. Raised portions 4a and 5a are formed on the outer and inner circumferential portion of fourth window 4b and fifth window 5c on the clutch plate 4 and the retaining plate 5, respectively, at positions corresponding to the outer and inner circumferential portions of second window 3c. A second coil spring 7 is disposed in the space defined by the raised portions 4a and 5a and the second window 3c on the second flange 3. As can be seen in FIG. 1, an additional coil spring 13 may be inserted in the interior space of coil spring 7. The diameter of the wires and coils of second coil spring 7 is larger than first coil spring 6a, and it is also more rigid than first coil spring 6a. The second coil spring 7 has a generally trapezoidal shape and is composed of a plurality of wire coils which spirally extend at a generally constant pitch. The second coil spring 7 is formed with tapered end portions 7a, and are disposed at a pitch such that they lie in generally the same plane as the last coil on each end of the second coil spring 7 and lie flat against the radially extending end portions 3e of the second window 3c. The last coil on each end of the coil spring and each tapered end portion 7a define a spring end 7b. Each spring end 7b lies flat against the radially extending portions 3e of the second window 3c when the second coil spring 7 is in a neutral state, and therefore there is no gap between the spring ends 7b and the radially extending portions 3e.

Figure 5:
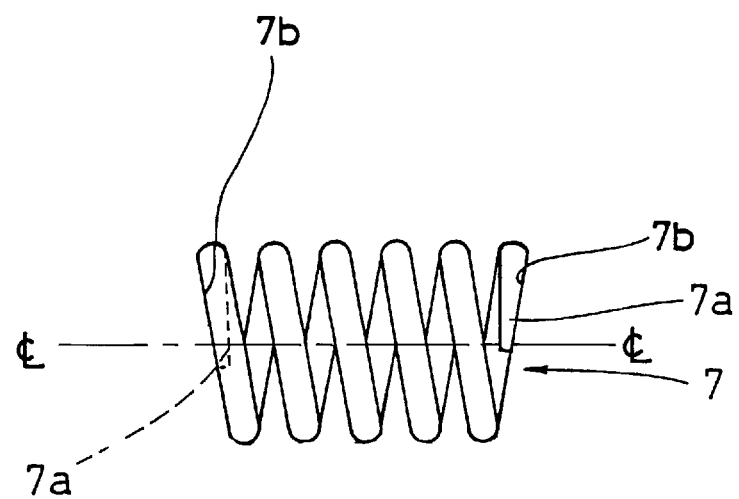
FIG. 5 is a side elevation of the coil spring depicted in FIGS. 1, 3, and 4, shown removed from the clutch disc assembly.

The second coil spring 7 is shown removed from the second window 3c and clutch disc assembly in FIG. 5 in a torsion and compression free state.

A plurality of cushioning plates 22 are shown in FIG. 1, connected with the outer circumferential edge of the clutch plate 4 by a plurality of rivets 21. Annular frictional facings 23 are fixed to both sides of the cushioning plates 22. When the frictional facings 23 are pressed against a flywheel (not shown) by a pressure plate (not shown), the torque from the engine is transmitted to the clutch disc assembly 1.

FIG. 1 shows a frictional washer 8 and a conical spring 9 interposed between the inner circumferential portion of the retaining plate 5 and the inner circumferential portion of the second flange 3. The frictional washer 8 is engaged with the retaining plate 5 so as to rotate together in unison. The outer circumferential edge of the conical spring 9 is engaged with the retaining plate 5, with its inner circumferential edge being biased against the inner circumferential side of the second flange 3.

A second frictional washer 19 is interposed between the inner circumferential portion of the clutch plate 4, and the inner circumferential portion of the second flange 3, the first flange 2b and the projections 2c of the hub 2.

The operation of the clutch disc assembly 1 will now be described.

When the frictional facings 23 are brought into contact with the flywheel (not shown), the torque from the engine is transmitted to the clutch plate 4 and the retaining plate 5. The torque is then transmitted to the hub 2 through the second coil spring 7, the second flange 3 and the first coil spring 6a, and is finally transmitted to the input shaft (not shown).

If a relatively small torsional vibration is transmitted from the flywheel (not shown) to the clutch disc assembly 1, the clutch plate 4 and the retaining plate 5 rotate relative to the second flange 3 and the hub 2. When this occurs, the first coil spring 6a is elastically deformed.

Figure 4:
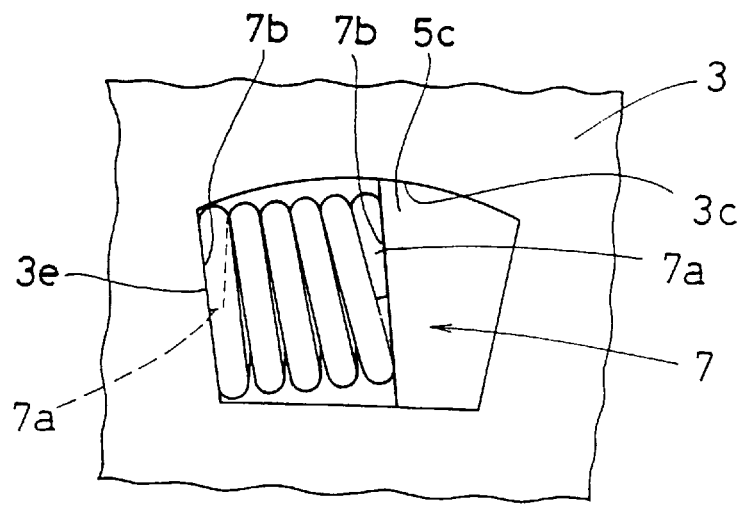
FIG. 4 is a fragmentary elevation of the portion of the clutch disc assembly depicted in FIG. 3 with the coil spring being elastically deformed.

If a relatively large torsional vibration is transmitted to the clutch disc assembly 1, the second flange 3 and the hub 2 are rotated together in unison, and a relative rotation occurs between these two components and the clutch plate 4 and the retaining plate 5. When this occurs, the second coil springs 7 are elastically deformed (see FIG. 4) by clutch plate 4 (not shown) and retaining plate 5, and the first frictional washer 8 is pressed against the separate flange 3 to thereby generate a large frictional force.

Because the spring ends 7b on the second coil springs 7 lie flat against the radially extending walls 3e of the second window 3c when there is no torsion stress applied to the clutch disc assembly 1, and the coils of the second coil springs 7 are disposed at an constant pitch, there is very little variation in the distribution of stress to the inner and outer circumferential portions of the second coil spring 7, as well as little or no bending stress. In addition, the even elastic deformation of the second coil springs 7 allows the inner and outer portions of spring ends 7b of the second coil spring 7 to be elastically deformed to a maximum level. This stabilizes its torsional rigidity, and therefore allows the clutch disc assembly 1 to respond to a high load.

Each spring ends 7b of the second coil spring 7 lie flat against the radially extending walls 3e of the second windows 3c, and therefore there is very little friction generated between the second window 3c and the second coil spring 7, thus prolonging the service life of the damper apparatus and the second coil spring 7.

Details of the present invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A coil spring comprising:
   a plurality of wire coils which spirally extend at a generally constant pitch, said wire coils defining a generally straight center line and including a first coil and a last coil, said first and last coil springs diverging away from one another defining in combination with remainder of said wire coils a generally trapezoidal shape with said wire coils in a torsion and compression free state, wherein said first coil includes a first end portion and said last coil includes a second end portion; and wherein each of said first and second end portions include a tapered surface disposed in a plane defined by a portion of said first and said last coils, respectively.

2. A damper apparatus, comprising:
   a first disc member having at least one first window formed therein, said first window being generally trapezoidal in shape;

a second disc member having at least one second window formed therein, said second window being generally trapezoidal in shape, said first and second disc members disposed adjacent to one another such that said first and second windows coincide;

a coil spring disposed within said first and second windows elastically coupling said first and second disc members, said coil spring having a plurality of wire coils which spirally extend at a generally constant pitch, said wire coils defining a generally straight center line and including a first coil and a last coil, said first and last coil springs diverging away from one another defining in combination with remainder of said wire coils a generally trapezoidal shape with said wire coils in a torsion and compression free state, wherein said first coil includes a first end portion and said last coil includes a second end portion; and wherein each of said first and second end portions include a tapered surface disposed in a plane defined by a portion of said first and said last coils, respectively.

3. The damper apparatus as set forth in claim 2, wherein each of said first and second windows are formed with end faces which generally coincide with a line which extends radially outwardly from an axial center of said first and second disc members.

4. The damper apparatus as set forth in claim 2, further comprising a hub disposed within a central portion of said first disc member, said hub configured for limited angular displacement with respect to said first disc member.

5. The damper apparatus as set forth in claim 4, further comprising a second coil spring disposed between said first disc member and said hub, said second coil spring elatically connecting said hub and said first disc member.

6. The damper apparatus as set forth in claim 2, further comprising a friction member disposed between said first and second disc members for creating friction in response to relative angular displacement between said first disc member and said hub.

* * * * *